US006482342B1

United States Patent
Malekmadani et al.

(10) Patent No.: US 6,482,342 B1
(45) Date of Patent: *Nov. 19, 2002

(54) RESIN TRANSFER MOLDING OF CENTRIFUGE ROTOR

(75) Inventors: Mohammad Ghassem Malekmadani, Palo Alto, CA (US); Charles Biddle, Stockton, CA (US); Hung Nguyen, Newark, CA (US); Reza Sheikhrezai, Menlo Park, CA (US)

(73) Assignee: Composite Rotor, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,589

(22) Filed: Sep. 22, 1999

Related U.S. Application Data

(62) Division of application No. 08/871,596, filed on Jun. 6, 1997, now Pat. No. 5,972,264.

(51) Int. Cl.[7] .......................... B04B 5/02; B32B 31/04; B32B 7/16
(52) U.S. Cl. .................. 264/102; 264/258; 264/112; 264/255; 264/135; 264/136; 264/137; 494/16; 494/81; 442/62; 442/68; 442/70; 442/72; 442/74; 442/286; 442/295
(58) Field of Search ................. 264/102, 258, 264/112, 255, 257, 135, 136, 137; 494/16, 18; 428/902; 442/62, 68, 70, 72, 74, 286, 295

(56) References Cited

U.S. PATENT DOCUMENTS 5,972,264 A * 10/1999 Malekmadani et al. ..... 264/102

* cited by examiner

Primary Examiner—Elizabeth M. Cole
(74) Attorney, Agent, or Firm—Coudert Brothers LLP

(57) ABSTRACT

A method for fabricating fiber-reinforced composite structures, including centrifuge rotors, by resin transfer molding (RTM) is disclosed. The method involves loading reinforcing fibers into a mold and then injecting resin into the mold to coat the fibers to form the composite structure. Two types of reinforcing fibers are used—fabric preforms at the surfaces of the structure and chopped fibers at the interior of the structure. Also disclosed is a fiber-reinforced composite structure comprising a skin layer of reinforcing fabric, chopped fibers distributed throughout the interior of the structure, and epoxy resin that binds the fabric and chopped fibers together into a fiber-reinforced composite structure. The resin transfer molding method is especially useful for fabricating composite centrifuge rotors.

28 Claims, 16 Drawing Sheets

RESIN TRANSFER MOLDING OF CENTRIFUGE ROTOR

This is a divisional application based on application Ser. No. 08/871,596, filed Jun. 6, 1997, now U.S. Pat. No. 5,972,264.

BACKGROUND OF THE INVENTION

1. Field of the Invention

This invention relates generally to centrifuge rotors made from composite materials, and relates more particularly to a process of fabricating structures, including centrifuge rotors, by resin transfer molding, and the resulting structures or rotors.

2. Description of the Relevant Art

Centrifuges are commonly used in medical and biological research for separating and purifying materials of differing densities. A centrifuge includes a rotor typically capable of spinning at tens of thousands of revolutions per minute.

A preparative centrifuge rotor has some means for accepting tubes or bottles containing the samples to be centrifuged. Preparative rotors are commonly classified according to the orientation of the sample tubes or bottles. Vertical tube rotors carry the sample tubes or bottles in a vertical orientation, parallel to the vertical rotor axis. Fixed-angle rotors carry the sample tubes or bottles at an angle inclined with respect to the rotor axis, with the bottoms of the sample tubes being inclined away from the rotor axis so that centrifugal force during centrifugation forces the sample toward the bottom of the sample tube or bottle. Swinging bucket rotors have pivoting tube carriers that are upright when the rotor is stopped and that pivot the bottoms of the tubes outward under centrifugal force.

Many centrifuge rotors are fabricated from metal. Since weight is a concern, titanium and aluminum are commonly used materials for metal centrifuge rotors.

Fiber-reinforced, composite structures have also been used for centrifuge rotors. Composite centrifuge rotors are typically made from laminated layers of carbon fibers embedded in an epoxy resin matrix. The fibers are arranged in multiple layers extending in varying directions at right angles to the rotor axis. During fabrication of such a rotor, the carbon fibers and resin matrix are cured under high pressure and temperature to produce a very strong but lightweight rotor. U.S. Pat. Nos. 4,781,669 and 4,790,808 are examples of this type of construction.

Composite centrifuge rotors are stronger and lighter than equivalent metal rotors, being perhaps 60% lighter than titanium and 40% lighter than aluminum rotors of equivalent size. The lighter weight of a composite rotor translates into a much smaller mass moment of inertia than that of a comparable metal rotor. The smaller moment of inertia of a composite rotor reduces acceleration and deceleration times of a centrifugation process, thereby resulting in quicker centrifugation runs. In addition, a composite rotor reduces the loads on the centrifugal drive unit as compared to an equivalent metal rotor, so that the motor driving the centrifuge will last longer. Composite rotors also have the advantage of lower kinetic energy than metal rotors due to the smaller mass moment of inertia for the same rotational speed, which reduces centrifuge damage in case of rotor failure. The materials used in composite rotors are resistant to corrosion against many solvents used in centrifugation.

A disadvantage of composite centrifuge rotors is that the loading of the rotor due to centrifugal forces can cause delaminations and failure of the structure. Reinforcing structures such as outer shells may be necessary to provide adequate structural strength, such as disclosed in U.S. Pat. Nos. 5,362,301 and 4,790,808. Another disadvantage is that extensive and costly machining of the laminated core is required in order to form the outer shape of the rotor and to form the cell holes that receive the sample tubes or bottles containing the samples to be centrifuged.

SUMMARY OF THE INVENTION

In accordance with the illustrated preferred embodiment, the present invention is a method for fabricating fiber-reinforced composite structures, including centrifuge rotors, by resin transfer molding (RTM), and the resulting composite structures. The method basically involves loading reinforcing fibers into a mold and then injecting resin into the mold to coat the fibers to form the composite structure. Either one or two molds can be used for the process. If two molds are used, most or all the reinforcing fibers are loaded into a first mold and then cured into a porous fiber structure and then the porous fiber structure is transferred to a second mold for resin injection and curing.

One aspect of the present invention is a method for fabricating a fiber-reinforced composite structure in a single mold, including the steps of: (a) forming fabric preforms corresponding to the surface of the structure; (b) placing some of the fabric preforms into a mold; (c) placing chopped fibers in the mold; (d) placing the remainder of the fabric preforms into the mold so that the fabric preforms are adjacent to the interior surfaces of the mold and the chopped fibers are inside the fabric preforms; (e) injecting resin into the mold to coat all the fabric preforms and chopped fibers; (f) curing the resin in the mold; and (g) then removing the completed structure from the mold.

Another aspect of the method is to use two molds, a first mold to form the preforms and chopped fibers into a porous fiber structure called a "birds nest," and a second mold for the resin injection. The molds may incorporate a mold insert or mandrel that is moved from the birds nest mold to the injection mold with the birds nest structure.

Another aspect of the method is the forming of the fabric preforms, which is done by applying resin in the form of a solid powder or other forms to a piece of fabric, heating the fabric and then inserting it into a forming tool, which forms the fabric into the desired shape. The resin adds stiffness so that the fabric preform can retain its shape until it is placed into the mold for forming the birds nest and/or resin injection.

Yet another aspect of the present invention is a fiber-reinforced composite structure comprising a skin layer of reinforcing fabric adjacent the surfaces of the structure, chopped fibers distributed throughout the interior of the structure and under the skin layer, and epoxy resin throughout the structure, which binds the fabric and chopped fibers together into a fiber-reinforced composite structure. Fabric preforms are positioned adjacent to the surfaces of the structure, and provide fiber reinforcement for the entire surface. The chopped fibers are located randomly within the interior of the structure, and provide fiber reinforcement throughout the structure.

A preferred structure resulting from the resin transfer molding method is a centrifuge rotor, and so the invention encompasses both the centrifuge rotor itself and the method of making it.

The present invention provides a simple and cost-effective method of fabricating fiber-reinforced composite centrifuge rotors. The present invention uses composite materials and thus retains the advantages of all-composite construction in terms of light weight, low energy, and corrosion resistance, while reducing weight and eliminating material waste, costly machining, and add-on reinforcing shells.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

FIGS. 1 through 17 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

A preferred embodiment of the present invention is a method of fabricating a composite material centrifuge rotor by resin transfer molding (RTM), and the resulting composite rotor. This method of fabricating composite structures, however, is not restricted to fabricating only centrifuge rotors, because it is useful for fabricating advanced composite structures other than centrifuge rotors.

The composite structures made according to the present invention have reinforcing fibers in two forms—continuous fiber in the form of fabric preforms of woven cloth or braided tubing located throughout all surfaces of the structure, and chopped fibers located throughout the interior of the structure. The reinforcing fibers are encapsulated in an epoxy resin to form the composite structure. The fabric preforms are positioned adjacent to the surfaces of the structure, and provide fiber reinforcement of the entire surface. The chopped fibers are located randomly within the interior of the structure, and provide fiber reinforcement below the surface of the structure.

The method of fabricating composite structures by resin transfer molding according to the present invention includes several basic steps. First, several fabric preforms are made by pressing woven cloth or braided tubing into desired shapes that when assembled generally conform to the surfaces of the finished structure. Then, the fabric preforms are assembled in a mold and chopped fibers are added to the interior of the space defined by the fabric preforms and mold. The mold has an interior cavity with walls that correspond to the shape of the composite structure. After all the reinforcing fibers, both chopped fibers and continuous fibers in the form of fabric preforms, are in the mold, the mold is evacuated and epoxy resin is injected to encapsulate the fibers. The mold is then heated to cure the epoxy resin. After the structure cures in the mold, the mold is opened and the finished structure is removed.

Figure 1:
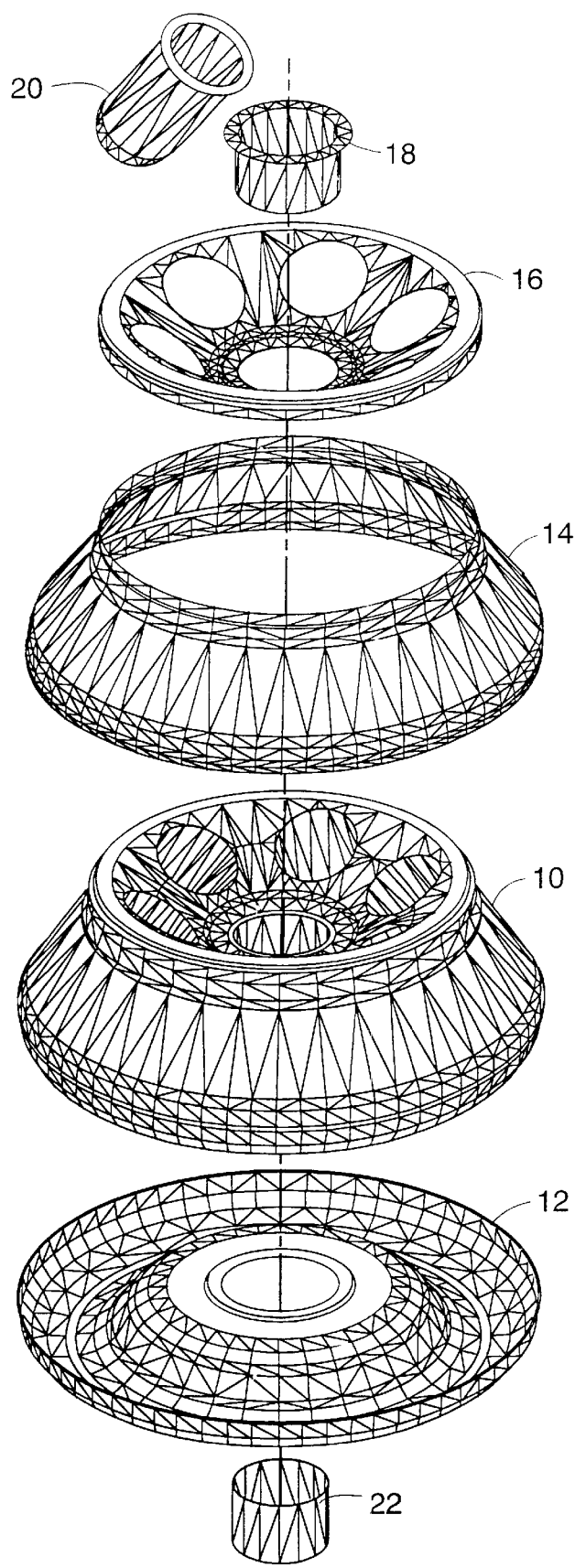
FIG. 1 is an exploded view of several fabric preforms used in the resin transfer molding (RTM) of a centrifuge rotor according to the present invention.
Figure 2:
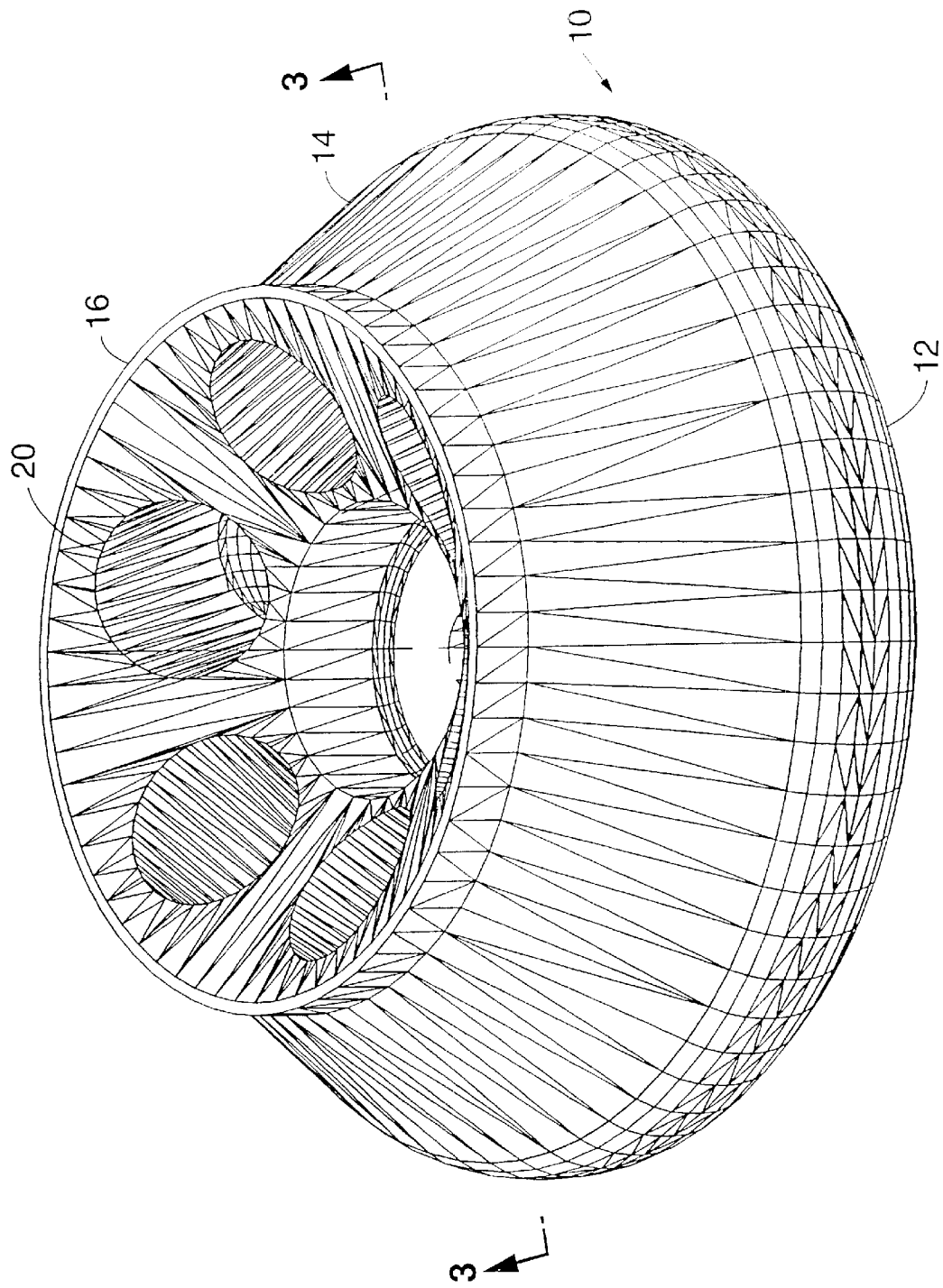
FIG. 2 is a perspective view of an assembly of the fabric preforms of FIG. 1.
Figure 3:
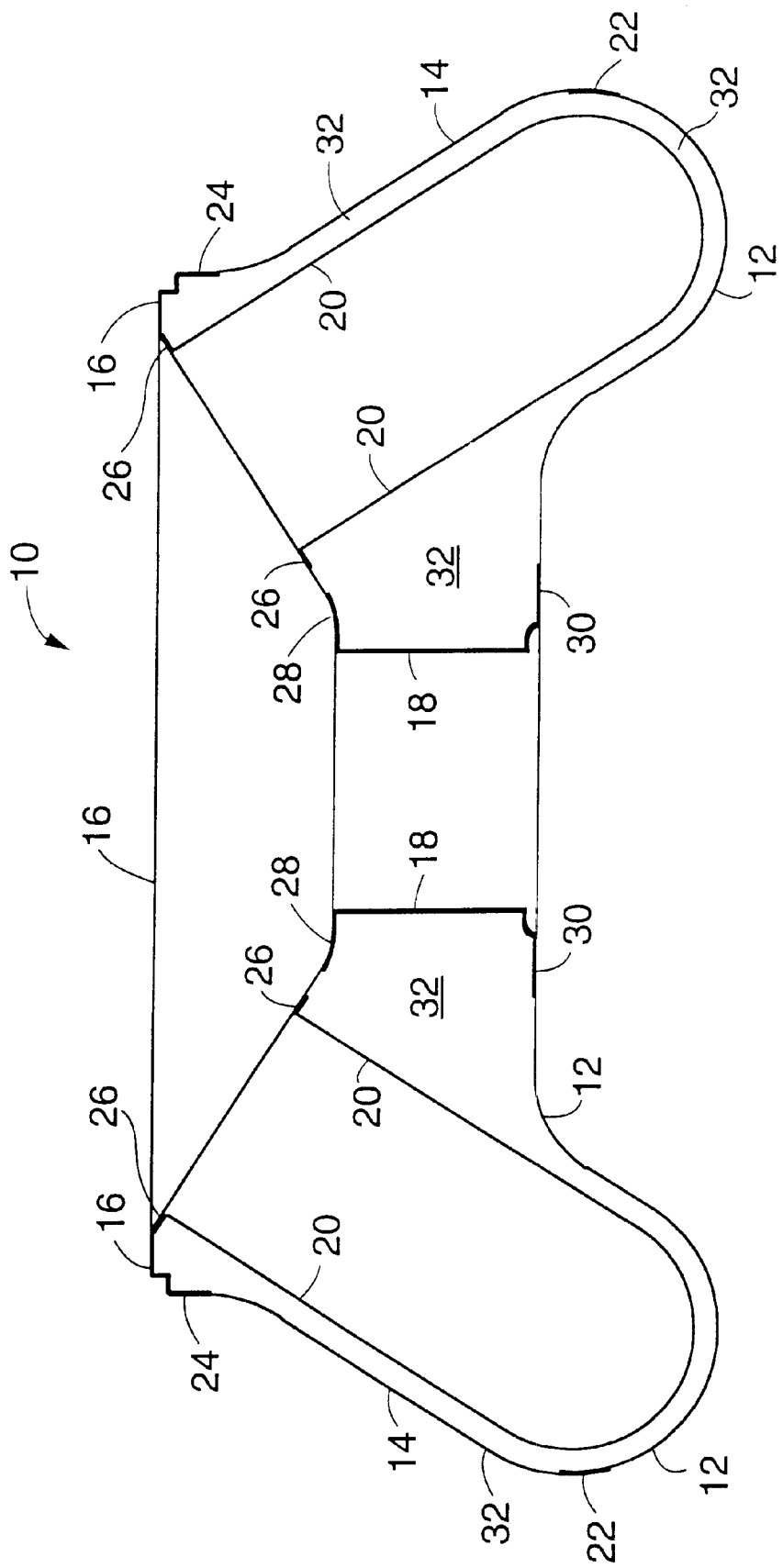
FIG. 3 is a sectional view of the assembly of fabric preforms of FIG. 2, taken along section line 3-3.

FIGS. 1–3 illustrate a fabric preform assembly 10 and the individual fabric preforms used in fabricating a six cell-hole fixed-angle centrifuge rotor according to the present invention. The fabric preform assembly 10 includes a bottom fabric preform 12, a side fabric preform 14, a top fabric preform 16, a hub fabric preform 18, and six cell-hole fabric preforms 20. FIG. 1 also shows a metal hub ring 22. FIG. 1 shows both the individual fabric preforms 12, 14, 16, 18, and 20, and the assembly 10 resulting from combining all the fabric preforms. Note that the lines on the surfaces of the fabric preforms are intended to denote the surface contours, not structural features.

Each fabric preform is made from a woven cloth or braided tube and is shaped to approximate the surface contours of the finished rotor structure. As shown in FIG. 3, the bottom fabric preform 12 defines a lower surface of the fabric preform assembly 10, and overlaps an outer edge of the side fabric preform 14 at a circumferential band 22. An upper edge of the side fabric preform 14 overlaps an outer edge of the top fabric preform 16 at a circumferential band 24. The top fabric preform 16 overlaps the cell-hole fabric preforms 20 at the periphery 26 of the cell holes, and overlaps the hub fabric preform 18 at 28. The hub fabric preform 18 also overlaps the bottom fabric preform 12 at 30. As used herein, the term overlap refers to the edges or borders of two fabric preforms overlying each other, regardless of which preform is innermost or outermost. Preferably, the amount of overlap is about one-half inches. The metal hub ring 22, not shown in FIG. 3, is sized to fit just inside of the hub fabric preform 18 so as to provide an adapter to a hub assembly for the finished centrifuge rotor.

The fabric preform assembly 10 defines an interior void space 32 which, as described further below, is filled with chopped fibers before resin is added. In the process of fabricating a centrifuge rotor, described herein, the fabric preform assembly 10 is a conceptual structure rather than an actual, stand-alone structure. As described below, portions of the fabric preform assembly are assembled in a mold, the interior void space 32 is filled with chopped fibers, and then the remainder of the fabric preforms are put into place, all prior to the step of resin injection.

Figure 4:
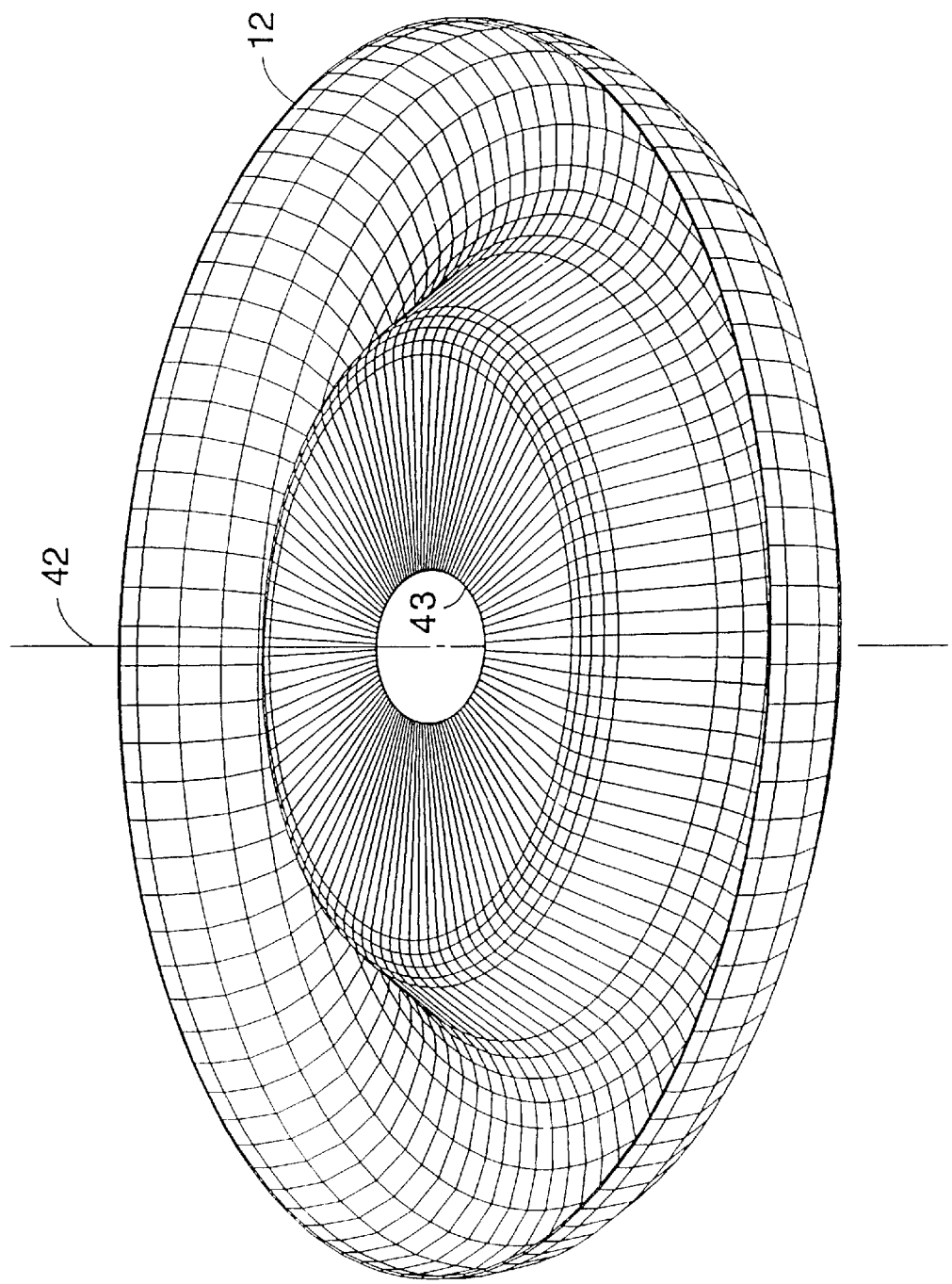
FIG. 4 is a perspective view of a bottom fabric preform according to the present invention.
Figure 5:
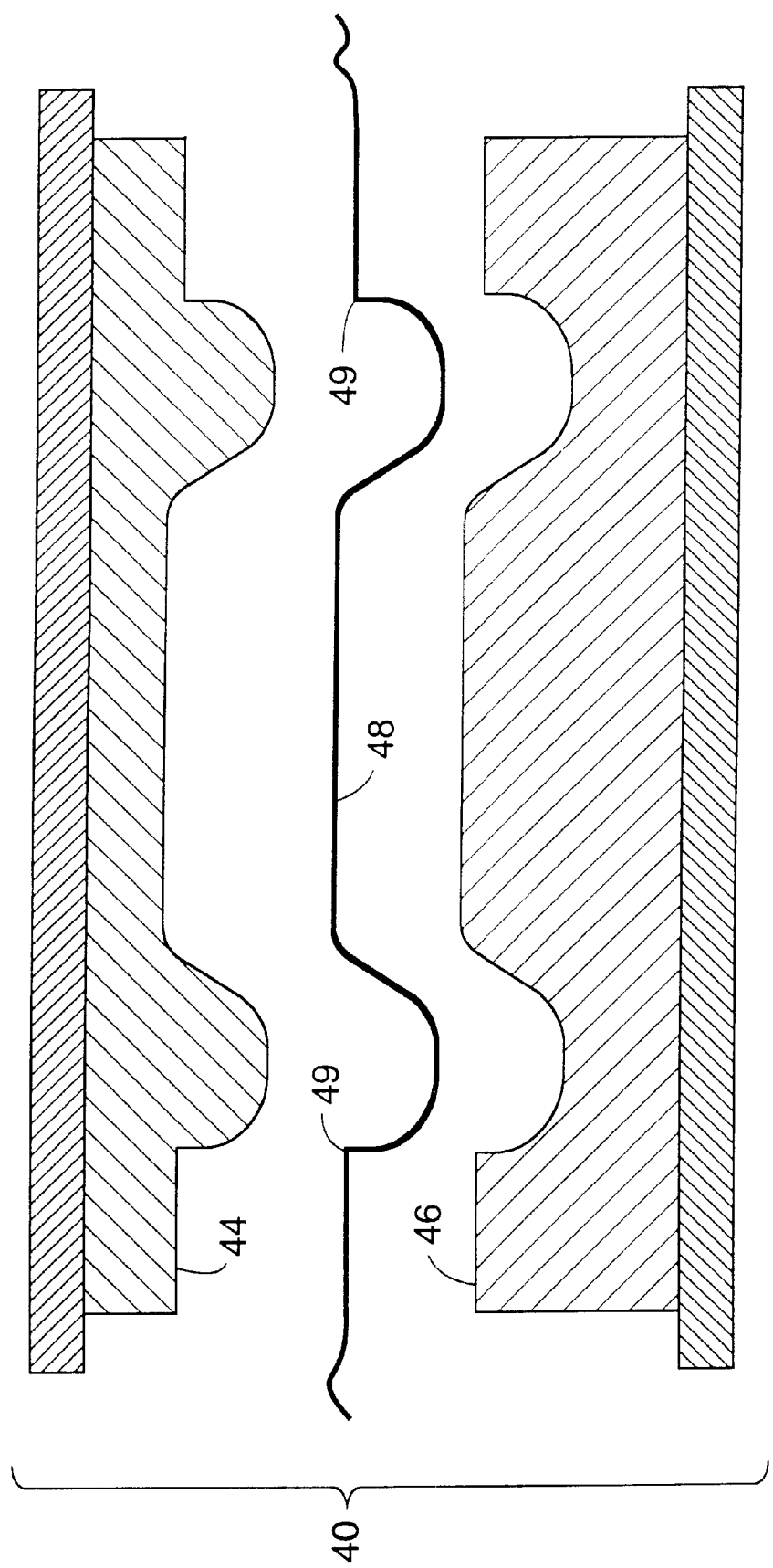
FIG. 5 is a sectional view of a die set used to form the bottom fabric preform of FIG. 4.

FIGS. 4–12 illustrate the fabric preforms and the tools used to form them. Specifically, the bottom fabric preform 12 is shown in FIG. 4 and its forming tool 40 is shown in FIG. 5. The bottom fabric preform 12 is axi-symmetric about axis 42, and includes a hole 43 at the axis to accommodate the hub. The tool 40 includes a lower mold 44 and an upper mold 46 that are shaped to the desired contour of the bottom fabric preform 12.

The bottom fabric preform 12 is formed as follows. First, a piece of woven cloth, composed of carbon fibers, is cut roughly to the size of the tool. Then a small amount (preferably about 4% of the weight of the cloth, and preferably less than about 6% of the weight of the cloth) of powered solid epoxy resin is applied evenly to the top surface of the cloth and the cloth and applied resin is radiantly heated for about forty seconds, sufficient for the resin to melt and to be absorbed by the cloth. Then the heated cloth is placed between the lower and upper molds 44 and 46 and the tool 40 is closed, thereby stretching the cloth to conform to the contours of the mating surfaces of the mold. After about one minute, the mold is opened and the formed cloth 48 is removed. A sheet of PTFE or other non-stick material may be used between the cloth and the mold to prevent sticking to the mold. After the formed cloth 48 is removed from the mold, the excess portions of the cloth at the outer edge 49 and at the center are trimmed away, leaving the bottom fabric preform 12. A template may be used to guide the trimming of excess fabric. The fabric preform is stiff but bendable, much like a formed felt hat.

Figure 6:
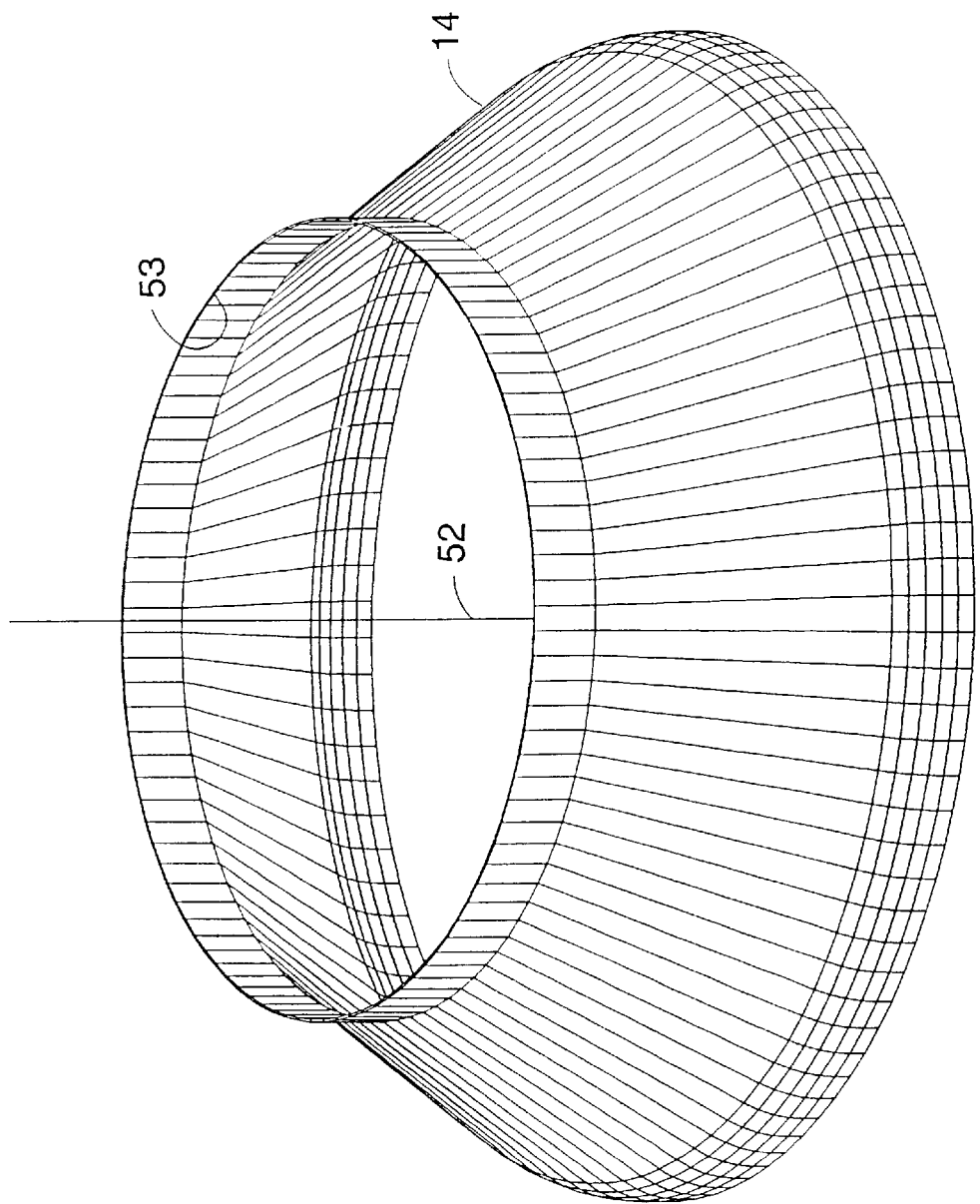
FIG. 6 is a perspective view of a side fabric preform according to the present invention.
Figure 7:
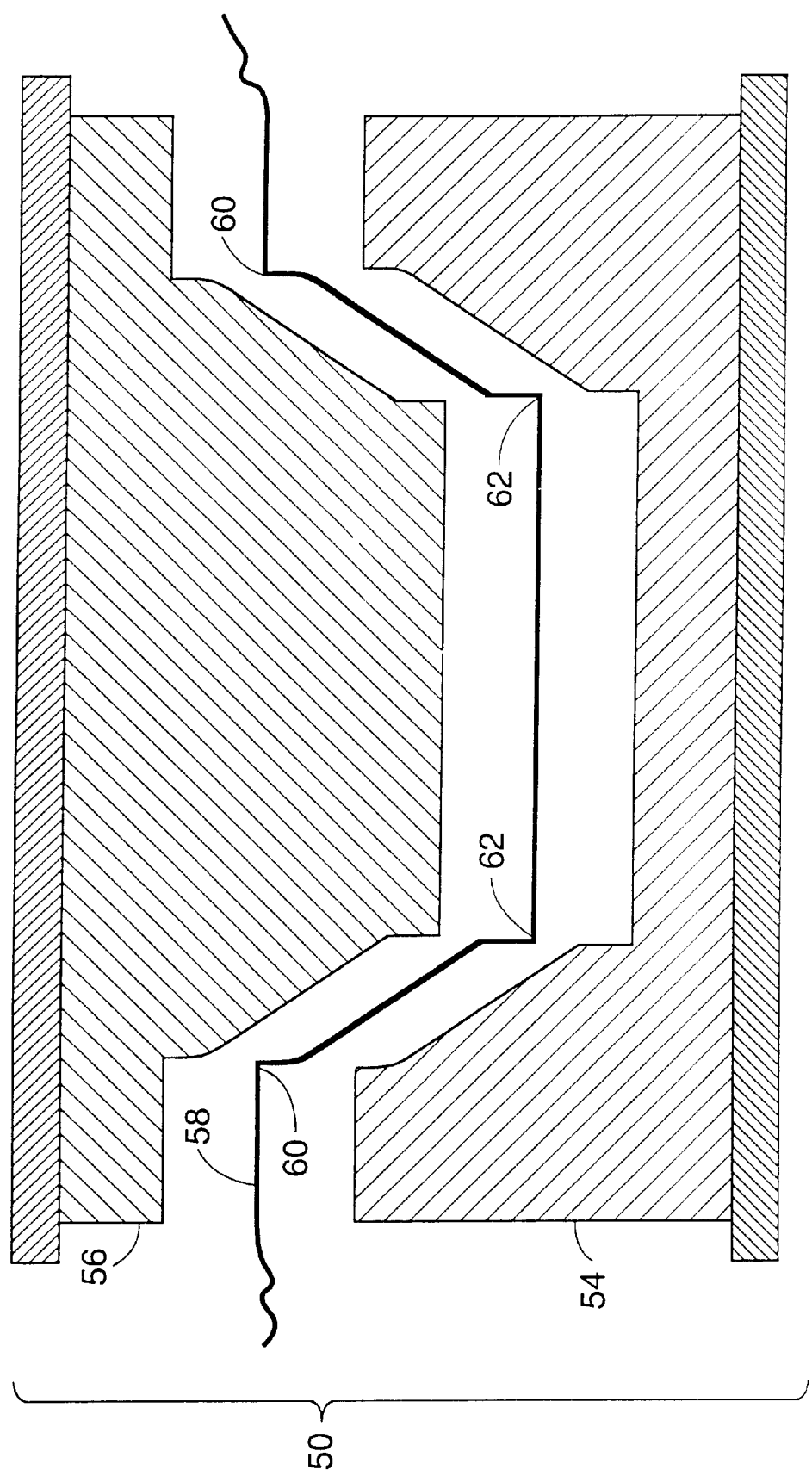
FIG. 7 is a sectional view of a die set used to form the side fabric preform of FIG. 6.

The side fabric preform 14 and its forming tool 50 are illustrated in FIGS. 6 and 7. The side fabric preform 14 is axi-symmetric about axis 52, and includes a central hole 53 to accommodate the top fabric preform 16. The tool 50 includes a lower mold 54 and an upper mold 56 that are shaped to the desired contour of the side fabric preform 14. The side fabric preform 14 is formed by the same process as described above for forming the bottom fabric preform, the only significant difference being the shape of the molds 54 and 56. The formed cloth 58 is trimmed at the outer edge 60 and inner edge 62, resulting in the side fabric preform 14. As an alternative to woven cloth of carbon fibers, a braided tube of carbon fibers could be used for the fabric in the side fabric preform 14.

Figure 8:
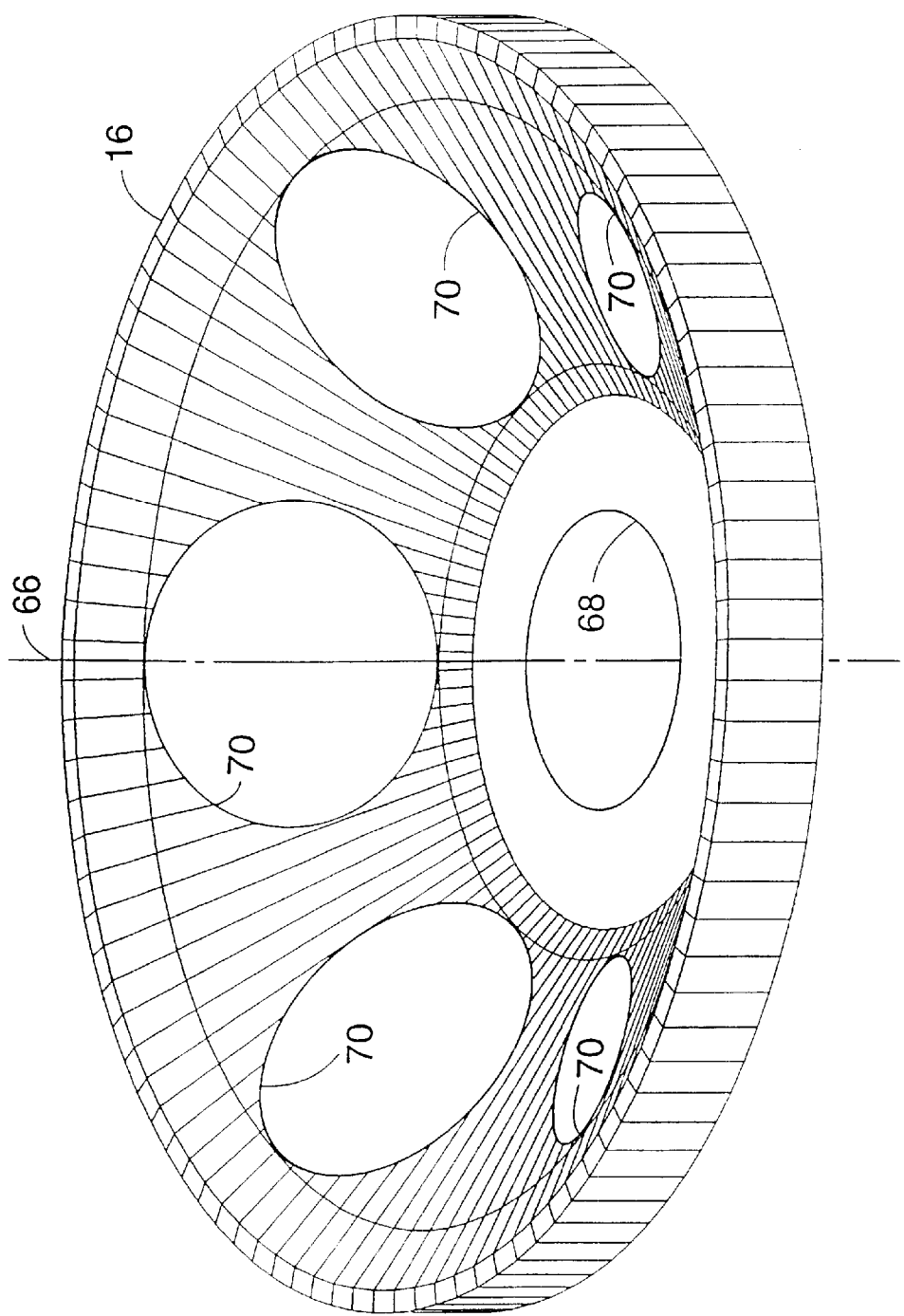
FIG. 8 is a perspective view of a top fabric preform according to the present invention.
Figure 9:
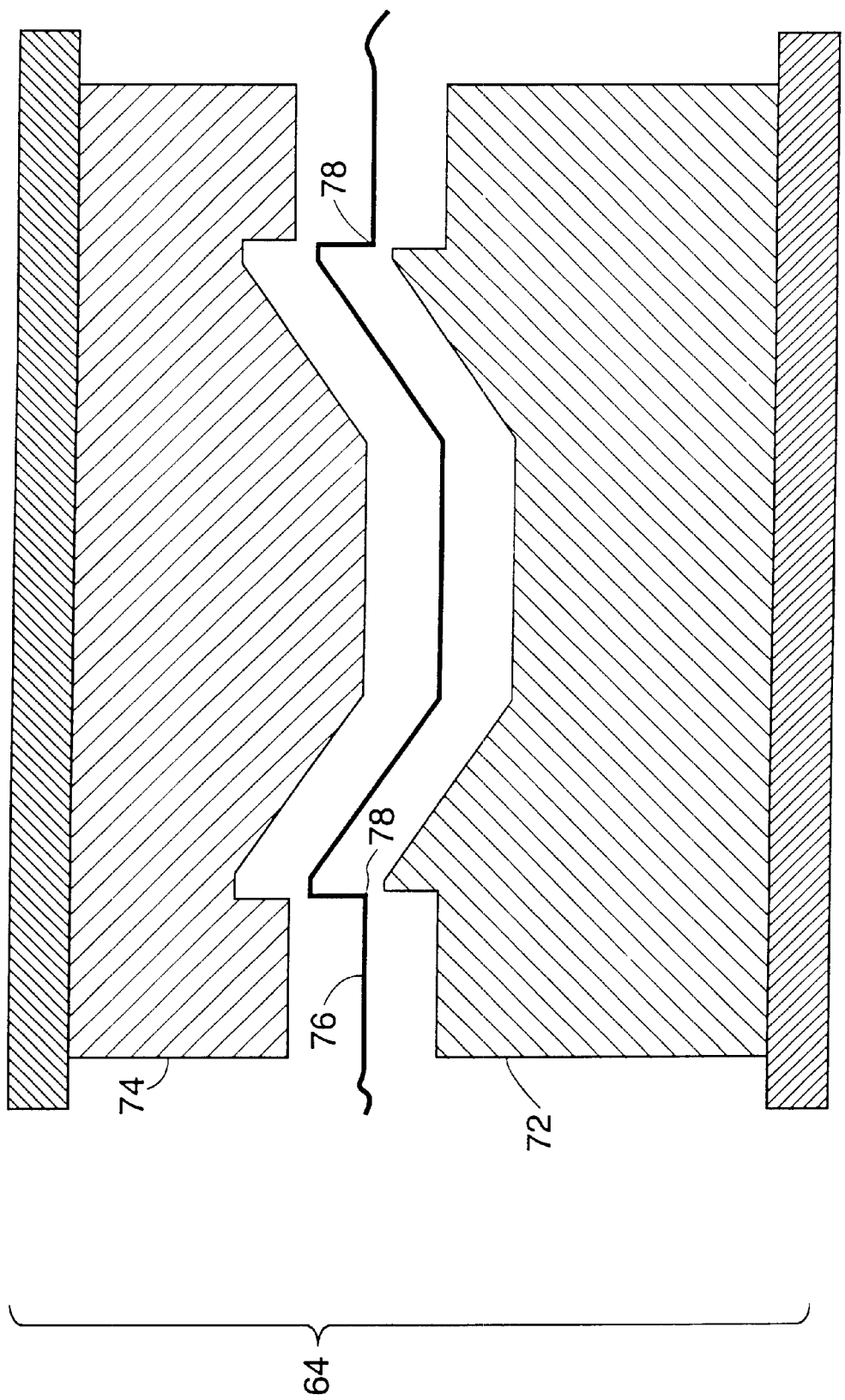
FIG. 9 is a sectional view of a die set used to form the top fabric preform of FIG. 8.

The top fabric preform 16 and its forming tool 64 are illustrated in FIGS. 8 and 9. The top fabric preform 16 is axi-symmetric about axis 66, and includes a central hole 68 to accommodate the hub fabric preform 18 and six holes 70 to accommodate the cell-hole fabric preform 20. The tool 64 includes a lower mold 72 and an upper mold 74 that are shaped to the desired contour of the top fabric preform 16. The top fabric preform 16 is formed by the same process as described above for forming the bottom and side fabric preforms, the only significant difference being the shape of the molds 72 and 74. The formed cloth 76 is trimmed at the outer edge 78 and at the holes 68 and 70, resulting in the top fabric preform 16. Cloth woven of carbon fibers is the preferred material for the top fabric preform 16.

Figure 10:
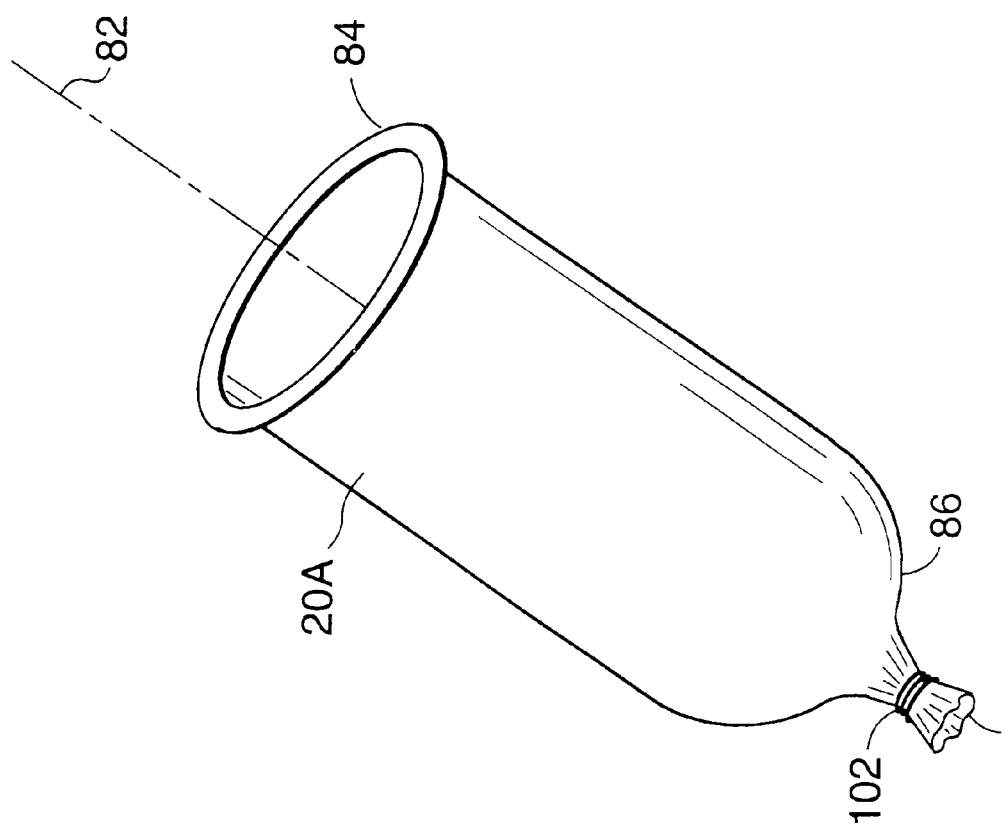
FIG. 10 is a perspective view of a cell-hole fabric preform according to the present invention.
Figure 11:
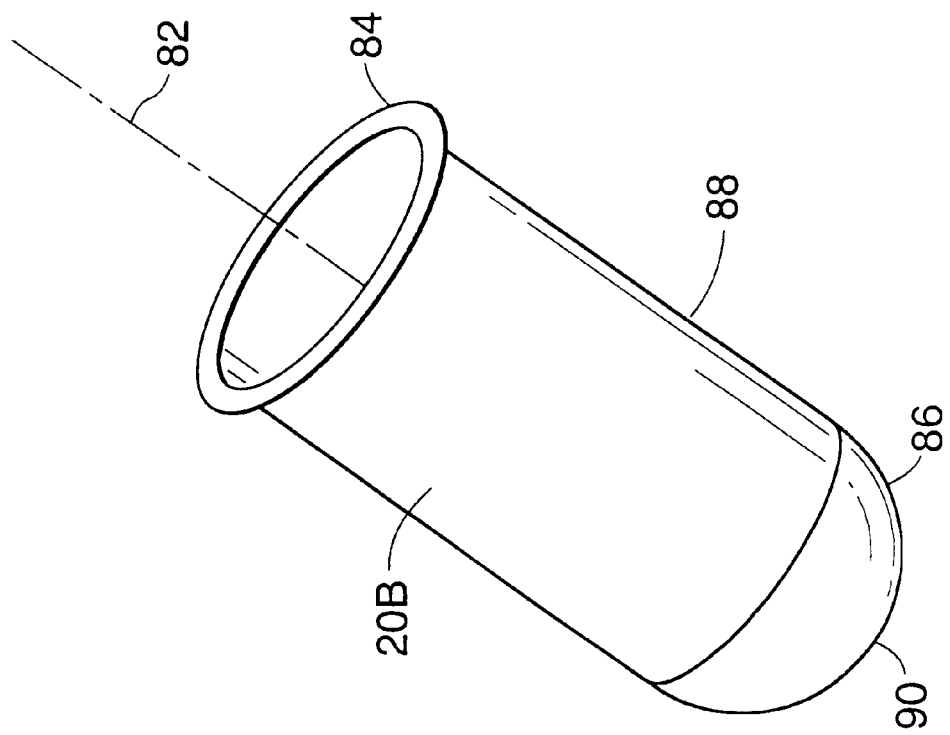
FIG. 11 is a perspective view of an alternative cell-hole fabric preform according to the present invention.
Figure 12:
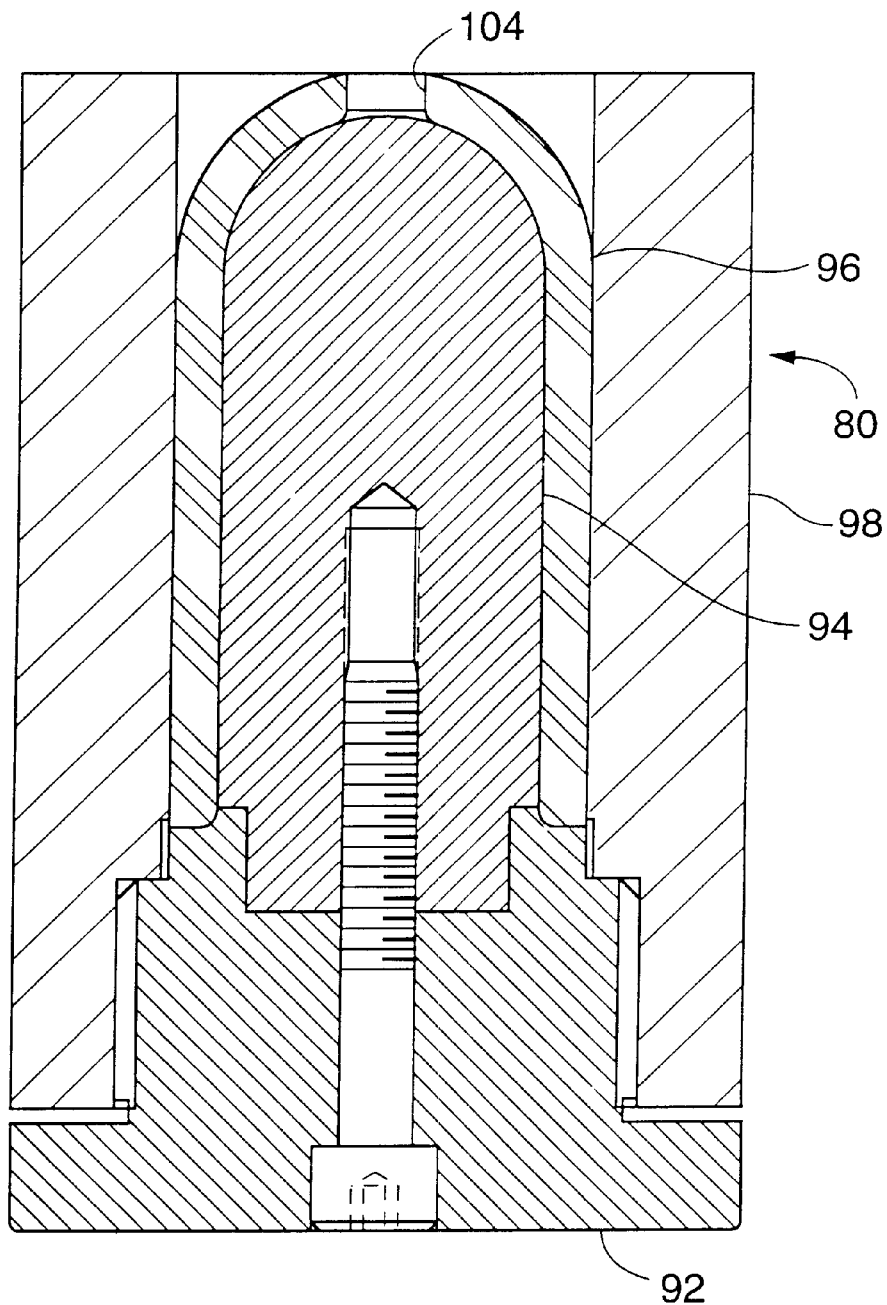
FIG. 12 is a sectional view of a die set used to form the cell-hole fabric preform of FIG. 10.

Two embodiments of the cell-hole fabric preform 20 are shown in FIGS. 10 and 11, and the associated forming tool 80 is shown in FIG. 12. The cell-hole fabric preform 20 is axi-symmetric about an axis 82 and has an open end with a flange 84 and a closed bottom end 86. The cell-hole fabric preform 20A of FIG. 10 is composed of braided tubing of carbon fibers. The cell-hole fabric preform 20B of FIG. 11 is composed of a sleeve 88 formed from braided tubing and a hemispherical cap 90 formed from woven cloth, then bonded together.

The forming tool 80 shown in FIG. 12 can be used for forming either cell-hole fabric preform. The tool has two parts—a male mold composed of a base 92 and a mandrel 94, and a female mold composed of a shell 96 and a case 98. The cell-hole fabric preform 20A of FIG. 10 is formed by placing a piece of braided tubing on the mandrel 94 and tying off its upper end 100 with a length of yarn 102. Then about 6% by weight of powdered epoxy resin is applied to the fabric, which is then heated by a heat gun until the resin is melted and absorbed into the fibers, then the shell 96 and case 98 are placed on the mandrel to form the preform. The tied-off end of the braided tubing protrudes through a hole 104 in the top of the shell 96. The formed cell-hole fabric preform is removed from the tool and the excess material is trimmed away.

The cell-hole fabric preform 20B of FIG. 11 is formed in multiple steps. First, braided tubing is formed into the sleeve 88 using the steps described above for forming the preform 20A, except that the tied-off end is trimmed away. The cap 90 is formed on the hemispherical end of the mandrel 96 by placing a piece of woven cloth on the mandrel and a O-ring to hold it in place, then applying about 6% by weight of powdered epoxy resin to the fabric, then heating the resin with a heat gun until it is melted and absorbed by the fabric. The cap is removed from the mandrel and trimmed to size. Then, the sleeve 88 is again placed on the mandrel, powdered epoxy resin is applied to the sleeve and cap where they will overlap, the cap is placed on the mandrel over the sleeve, a PTFE sheet is placed over the mandrel and fabric components and the resin is heated with a heat gun. The melted resin bonds the cap 90 to the sleeve 88 to complete the formation of the cell-hole fabric preform 20B.

Figure 13:
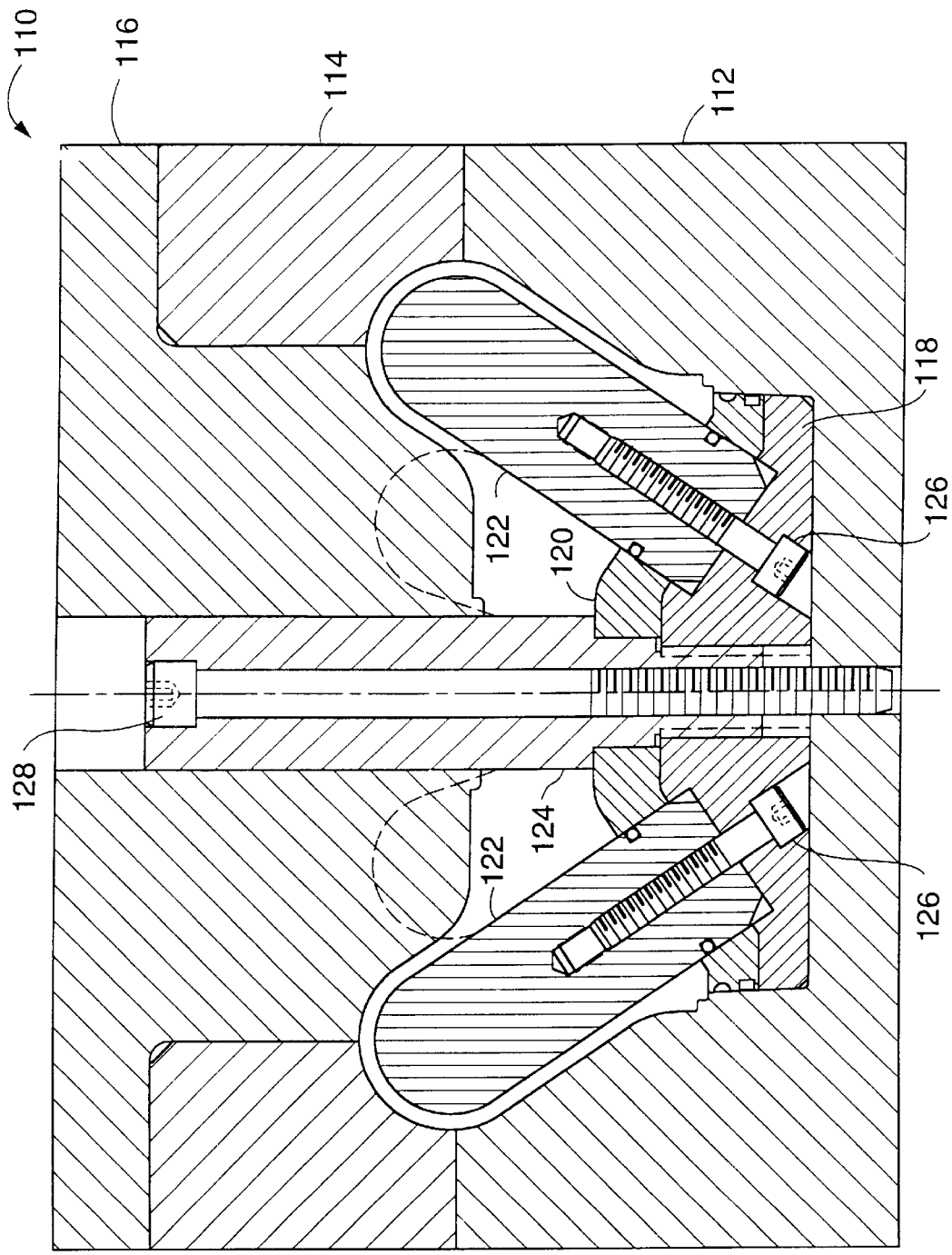
FIG. 13 is a sectional view of a birds nest mold used in fabricating the centrifuge rotor of the present invention.

FIG. 13 shows a birds nest mold 110 used to consolidate the fabric preforms and chopped fibers into a "birds nest," which is a porous structure of fibers bound together with a small amount of resin. The birds nest mold 110 includes a base 112, midsection 114, top 116, hub base plate 118, hub top plate 120, six cell-hole mandrels 122, and a center mandrel 124 assembled as shown in FIG. 13. Note that the birds nest mold 110 (and the injection mold 140 of FIGS. 14 and 15) are oriented with the rotor upside down. The birds nest mold 110 has a cavity with walls that conform to the desired shape of the finished composite structure.

Assembly of the birds nest mold 110 begins with the hub top plate 120. The hub fabric preform 18 is inserted into the central hole 68 (FIG. 8) of the top fabric preform 16 and the two preforms are placed on the hub top plate 120. The six cell-hole mandrels 122 are inserted through the holes 70 in the top fabric preform 16 and through corresponding holes in the hub top plate 120. This assembly is then placed on the hub base plate 118 and the six cell-hole mandrels 122 and the hub top plate 120 are secured to the base with bolts 126. The center mandrel 124 is inserted through the hub fabric preform 18 and into the hub base plate 118. The assembly is then turned over and the side fabric preform 14 is positioned with its outer edge overlapping the top fabric preform 16. The assembly is turned over again and the cell-hole fabric preforms 20 are placed on the six cell-hole mandrels 122. Then the assembly is placed into the base 112 of the birds nest mold and secured by a bolt 128. At this point, the preforms are arranged as shown in FIGS. 2 and 3 with the exception that the bottom fabric preform 12 is not yet in place, which allows access to the void space 32 inside the preforms to add the chopped fibers.

After the hub assembly, as described above, is placed in the mold base 112, chopped carbon fibers are added. The amount of chopped fibers depends on the desired percentage of fiber to the overall weight of the finished rotor. In the preferred embodiment, fiber (from both the fabric preforms and the chopped fibers) makes up about 60% of the weight of the rotor. The chopped fibers are added to the birds nest mold, taking care to distribute them around and under the cell-hole mandrels 122. After most of the chopped fibers have been added, the upper half of the mold (midsection 114 and top 116) is lowered to the base 112, thereby compressing the chopped fibers. The midsection 114 is then bolted to the base 112 and the top 116 is raised to provide access to the middle of the mold cavity. The remainder of the chopped fibers are then added and the mold is again closed. The mold is then heated to about 240° F. for about one hour to cure the birds nest assembly. The resin already present in the preforms helps to bind the preforms and chopped fibers together into a porous structure—the birds nest. Optionally, additional powdered epoxy resin may be added along with the chopped fiber to provide more binder material for the birds nest. Preferably, the resin is less than 45% of the weight of the chopped fibers.

The process of making the birds nest, described above, does not include the step of placing the bottom fabric preform 12 in the birds nest mold. One could add the bottom fabric preform 12 to the birds nest prior to heating and curing in the birds nest mold, but it is preferred to add the bottom fabric preform to the birds nest when it is transferred to the injection mold.

Figure 14:
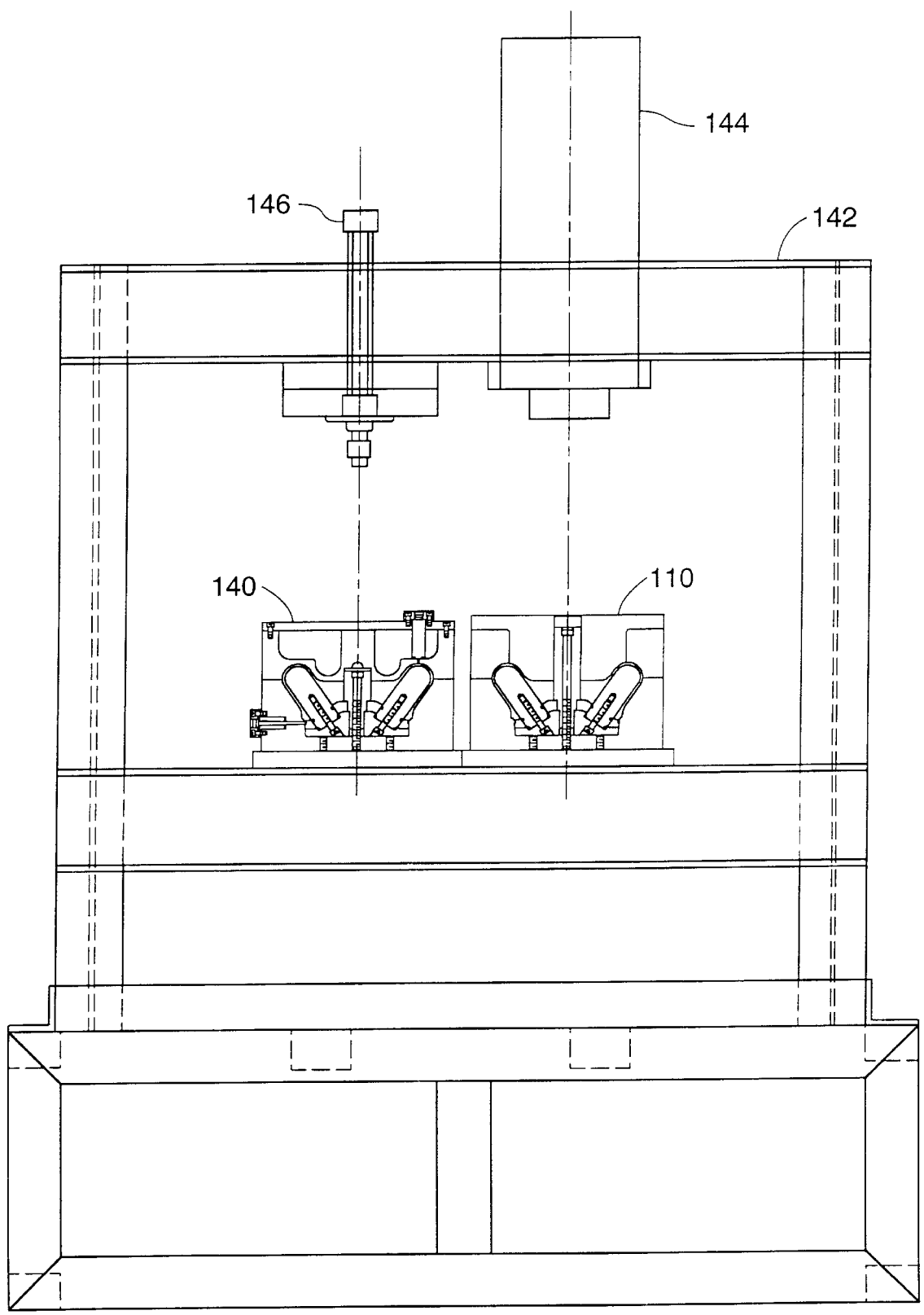
FIG. 14 is a side view, partially in section, of a molding machine utilizing the birds nest mold of FIG. 13 and the injection mold of FIG. 15.
Figure 15:
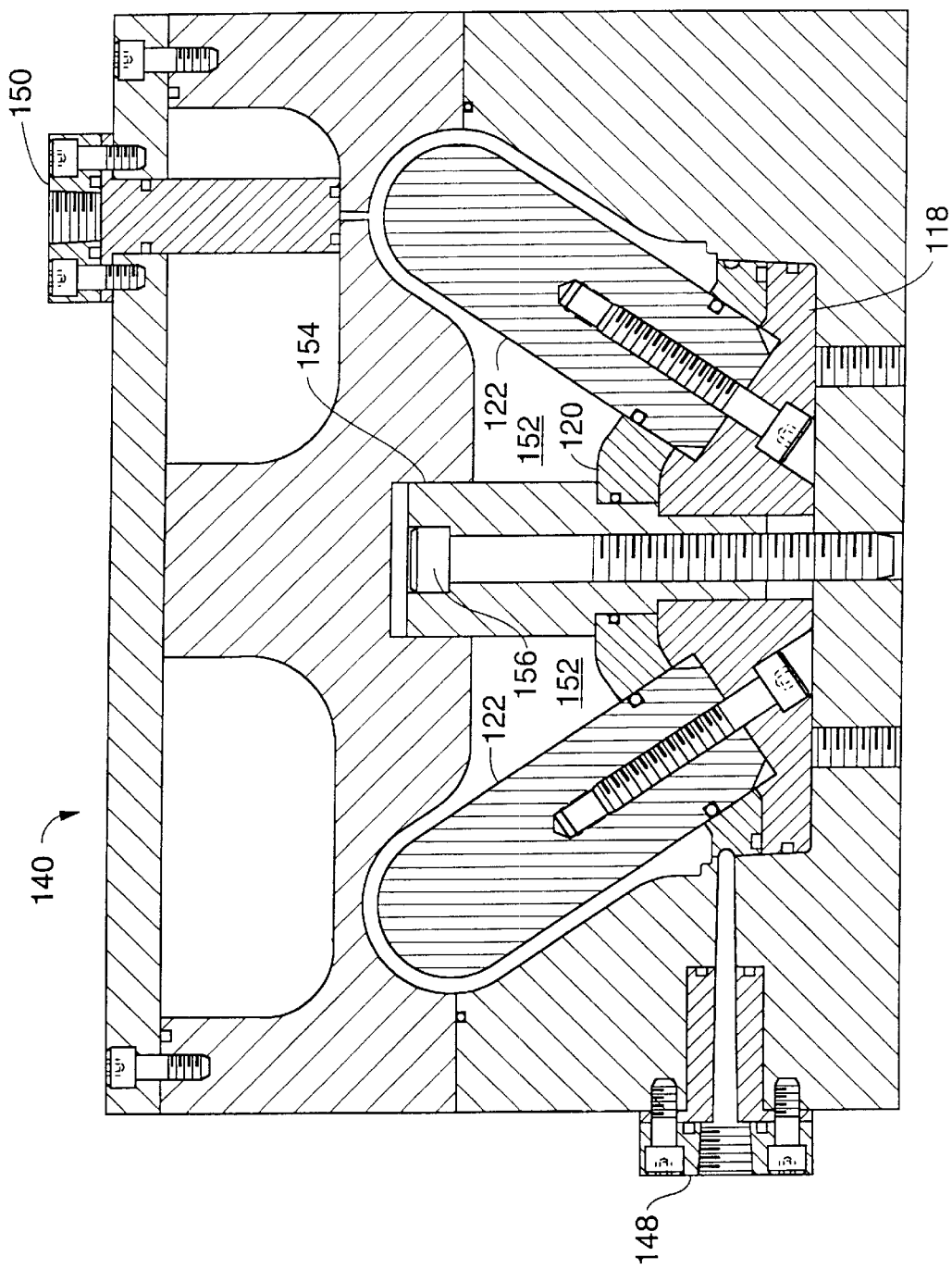
FIG. 15 is a sectional view of an injection mold used in fabricating the centrifuge rotor of the present invention.

The injection mold 140, shown in FIGS. 14 and 15, is preferably positioned next to the birds nest mold 110 in a molding machine 142. Each mold has a corresponding hydraulic ram 144 and 146 for opening and closing the mold. The injection mold 140 includes an injection port 148 and vacuum/exit port 150. The interior walls of the cavity 152 of the injection mold, including the hub assembly of the birds nest mold, defines the final shape of the rotor. The injection mold uses the hub base plate 118, hub top plate 120, and cell-hole mandrels 122 to maintain the shape of the birds nest during the molding process.

In use, the birds nest along with the support structure of the hub base plate 118, hub top plate 120, and cell-hole mandrels 122 are placed into the injection mold 140. The bottom fabric preform 12 is placed on top of the birds nest and the hub ring 22 is positioned inside the hub fabric preform 18. A center hub 154 is installed and the assembly is fastened in the mold by a bolt 156. The injection mold 140 is then closed and evacuated by applying a vacuum to the vacuum/exit port 150. The mold is heated to about 120° F. to facilitate the flow of resin. Resin is then injected through the injection port 148 until it fills the mold and comes out of the vacuum/exit port 150. The pressure of the injected resin and the temperature of the mold are both gradually increased, to about 350 psi and 170° F., respectively, to assure that the resin completely wets the fibers and fills all voids inside the mold. After the resin injection is completed, the injection mold 140 is heated to about 270° F. for about two hours to cure the molded structure. Then, the mold is cooled by water to room temperature and the molded rotor is removed. The hub base plate 118, hub top plate 120, and cell-hole mandrels 122 are removed from the molded rotor, and any post-molding clean-up is then performed.

The injection mold 140 may be used in a single mold process, wherein the fabric preforms and chopped fibers are loaded individually into the injection mold, thus eliminating the step of forming the birds nest in the birds nest mold.

Figure 16:
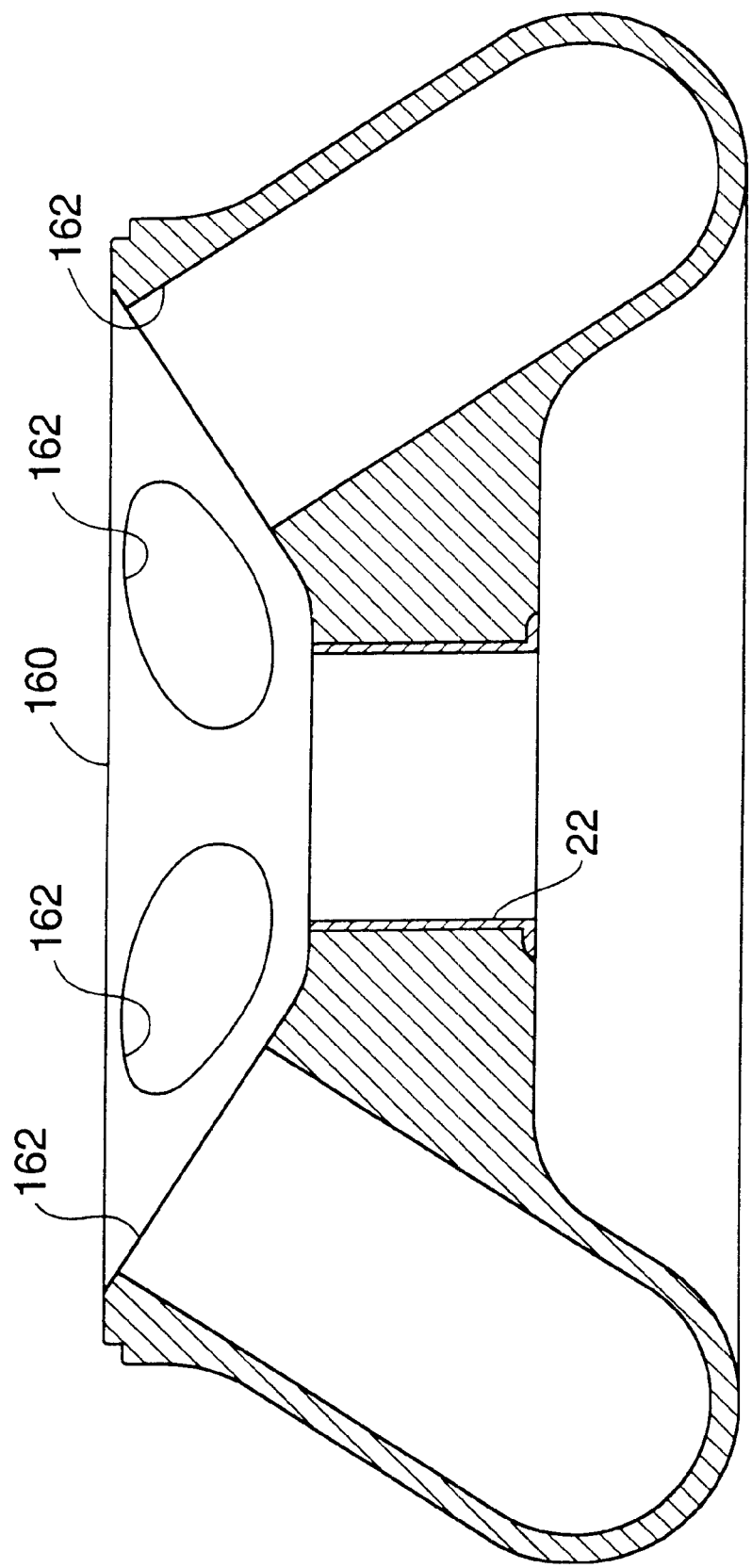
FIG. 16 is a sectional view of the centrifuge rotor of the present invention after completion of the molding process.

The completed rotor 160 is shown in a sectional view in FIG. 16. Cell holes 162 are present where the cell-hole mandrels 122 were. The entire surface of the rotor 160 is reinforced by the fabric preforms that lie at and just below the surface of the rotor. The interior of the rotor 160 is reinforced by the chopped fibers that are distributed throughout the interior. Resin binds all the fibers, both the fabric preforms and the chopped fibers, together. The hub ring 22 is at the inner diameter of the rotor 160, and receives a hub assembly 166 that couples the rotor to a centrifuge spindle. The result is a fiber-reinforced composite rotor that needs little if any post-molding finishing.

Figure 17:
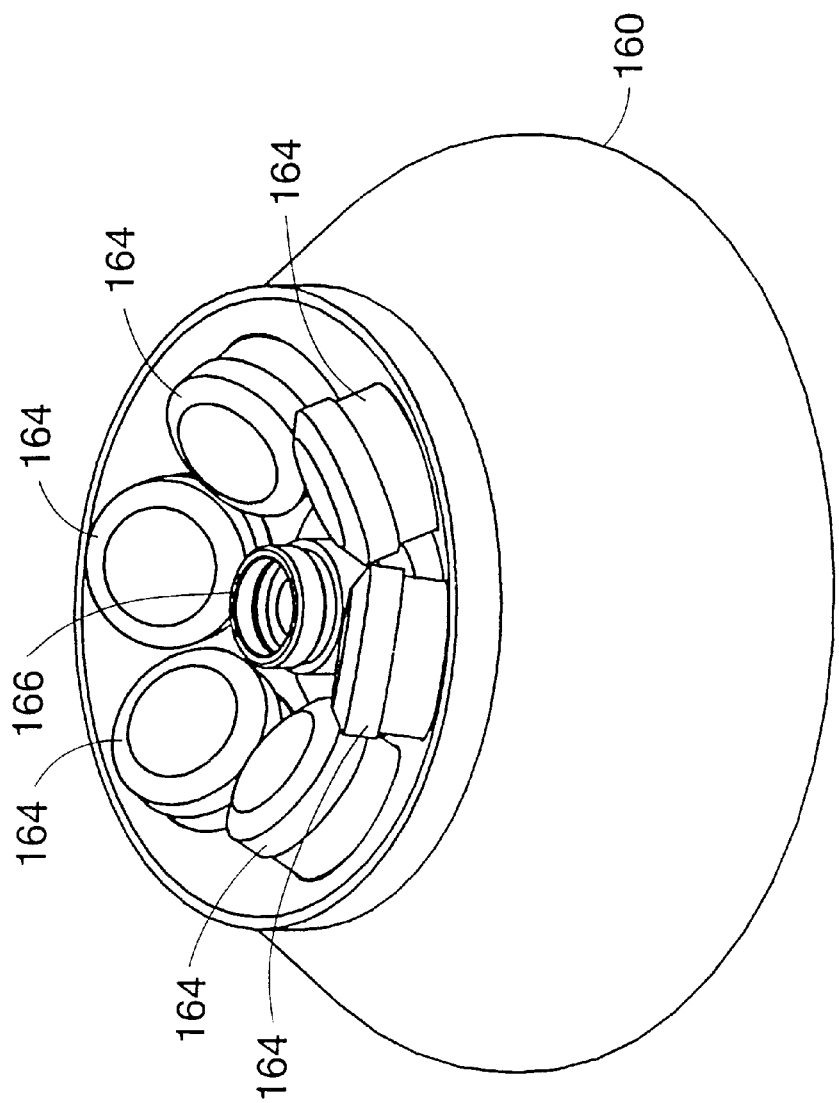
FIG. 17 is a perspective view of the centrifuge rotor of the present invention with sample holders and a hub installed.

FIG. 17 shows the rotor 160 with sample holders 164 in the cell holes. The hub 166 is also shown.

From the above description, it will be apparent that the invention disclosed herein provides a novel and advantageous fixed-angle centrifuge rotor fabricated from fiber-reinforced composite material, and an associated method of fabrication. The foregoing discussion discloses and describes merely exemplary methods and embodiments of the present invention. As will be understood by those familiar with the art, the invention may be embodied in other specific forms without departing from the spirit or essential characteristics thereof. For example, although a centrifuge rotor with fixed-angle cell holes (inclined toward the axis of rotation) is disclosed, a centrifuge rotor with vertically-oriented cell holes can also be made. As another example, although only one example of incorporating a prefabricated component (metal hub ring) into the molded structure is disclosed, a wide variety of prefabricated components can be so used. Further, the fabric preforms need not conform to the entire surface, but could be used to reinforce only the most heavily loaded regions of the structure. In addition, since the positioning of the fabric preforms need not be limited to the surface of the composite structure, more generally the fabric preforms (and the chopped fibers) may be located anywhere within the composite structure. Moreover, although only one example of a composite structure is disclosed, a wide variety of composite structures can be made according to the present invention. Accordingly, the disclosure of the present invention is intended to be illustrative, but not limiting, of the scope of the invention, which is set forth in the following claims.

What is claimed is:

1. A method for fabricating a fiber-reinforced composite structure having surfaces, said method comprising the steps of:

forming a plurality of fabric preforms each conforming to a portion of the surfaces of the structure;

providing a first mold having walls that correspond to the surfaces of the structure;

placing at least some of the fabric preforms into the first mold adjacent the walls of the first mold;

placing chopped fibers into the first mold;

closing the first mold and heating the first mold to bind the fibers therein together into a porous fiber structure;

opening the first mold and removing the porous fiber structure;

placing the porous fiber structure into a second mold, wherein the second mold has walls that correspond to the surfaces of the structure;

injecting resin into the second mold to coat the fabric preforms and chopped fibers;

curing the resin in the second mold; and removing the structure from the second mold.

2. A method as recited in claim 1 wherein some of the walls of the first mold are provided by a removable form, wherein the step of placing fabric preforms into the first mold includes placing fabric preforms on the removable form, and wherein the steps of removing the porous fiber structure and placing it into the second mold includes moving the removable form along with the porous fiber structure from the first mold to the second mold.

3. A method as recited in claim 1 wherein the step of placing chopped fibers into the first mold further includes placing resin into the first mold.

4. A method as recited in claim 3 wherein the resin placed into the first mold is a powdered solid epoxy resin.

5. A method as recited in claim 3 wherein the resin placed into the first mold comprises less than 45% of the weight of the chopped fibers.

6. A method as recited in claim 1 wherein the step of forming a plurality of fabric preforms includes the steps of:

providing a forming tool having a male portion and a female portion that mate together to define the desired shape of the fabric preform;

providing a piece, of fabric;

applying resin to the fabric;

heating the fabric and applied resin;

placing the heated fabric and applied resin in the forming tool and then closing the forming tool;

opening the forming tool and removing the fabric preform.

7. A method as recited in claim 6 wherein the fabric is a woven cloth fabric.

8. A method as recited in claim 6 wherein the fabric is a braided tubing fabric.

9. A method as recited in claim 6 wherein the resin used to form the preforms is powdered epoxy resin.

10. A method as recited in claim 6 wherein the resin used to form the preforms comprises less than 6% of the weight of the fabric.

11. A method as recited in claim 6 wherein the resin used to form the preforms comprises about 4% of the weight of the fabric.

12. A method as recited in claim 6 wherein the step of heating includes heating by radiant heat.

13. A method as recited in claim 6 further comprising a step of trimming excess fabric from the fabric preform.

14. A method as recited in claim 1 wherein the step of injecting resin into the second mold includes evacuating air from the second mold before injecting the resin.

15. A method as recited in claim 1 wherein the step of injecting resin into the second mold includes increasing the injection pressure of the resin during the injection step.

16. A method as recited in claim 1 wherein the step of injecting resin into the second mold includes increasing the temperature of the mold during the injection step.

17. A method as recited in claim 1 wherein adjacent fabric preforms overlap.

18. A method for fabricating a fiber-reinforced composite centrifuge rotor having surfaces, said method comprising the steps of:

forming a plurality of fabric preforms each conforming to a portion of the surfaces of the rotor;

providing a first mold having walls that correspond to the surfaces of the rotor;

placing at least some of the fabric preforms into the first mold adjacent the walls of the first mold;

placing chopped fibers into the first mold;

closing the first mold and heating the first mold to bind the fibers therein together into a porous fiber structure;

opening the first mold and removing the porous fiber structure;

placing the porous fiber structure into a second mold, wherein the second mold has walls that correspond to the surfaces of the rotor;

injecting resin into the second mold to coat the fabric preforms and chopped fibers;

curing the resin in the second mold; and removing the rotor from the second mold.

19. A method as recited in claim 18 wherein some of the walls of the first mold are provided by a removable form, wherein the step of placing the fabric preforms into the first mold includes placing the fabric preforms on the removable form, and wherein the steps of removing the porous fiber structure and placing it into the second mold includes moving the removable form along with the porous fiber structure from the first mold to the second mold.

20. A method as recited in claim 19 wherein the rotor has multiple cell holes, wherein the removable form has a mandrel corresponding to each cell hole, and wherein the step of placing fabric preforms into the first mold includes placing a fabric preform on each mandrel.

21. A method as recited in claim 18 wherein the fabric preforms include a bottom fabric preform conforming to the shape of a bottom of the rotor, a side fabric preform conforming to the shape of a side of the rotor, a top fabric preform conforming to the shape of a top of the rotor, and cell-hole fabric preforms equal in number to the number of cell holes in the rotor and conforming the shape of the cell holes.

22. A method as recited in claim 21 wherein the rotor is molded in an upside-down orientation, wherein the top fabric preform is placed into the first mold and then the cell-hole fabric preforms and side fabric preforms are placed into the first mold, and then the chopped fibers are placed into the first mold.

23. A method as recited in claim 22 wherein the bottom fabric preform is placed into the second mold on top of the porous fiber structure.

24. A method as recited in claim 21 wherein the fabric preforms further include a hub fabric preform conforming to the shape of an axial hub of the rotor.

25. A method as recited in claim 18 wherein adjacent fabric preforms overlap.

26. A method as recited in claim 18 further comprising a step of adding a metal hub ring to the second mold prior to the step of injecting resin.

27. A method for fabricating a fiber-reinforced composite centrifuge rotor having surfaces, said method comprising the steps of:

providing a mold having a cavity with walls that correspond to the surfaces of the rotor;

filling the mold cavity with chopped fibers;

injecting resin into the mold to coat all of the chopped fibers;

curing the resin in the mold; and removing the rotor from the mold.

28. A method for fabricating a fiber-reinforced composite structure having surfaces and an interior, said method comprising the steps of:

forming a plurality of fabric preforms each conforming to a portion of the surfaces of the structure and together conforming to all the surfaces of the structure;

providing a first mold having walls that correspond to the surfaces of the structure;

placing at least some of the fabric preforms into the first mold adjacent the walls of the first mold;

placing chopped fibers on the fabric preforms in the first mold;

closing the first mold and heating the first mold to bind the fibers therein together into a porous fiber structure;

opening the first mold and removing the porous fiber structure;

placing the porous fiber structure into a second mold, wherein the second mold has walls that correspond to the surfaces of the structure;

placing any additional fabric preforms into the second mold so that the fabric preforms are adjacent to the walls of the second mold and the chopped fibers are inside the fabric preforms;

injecting resin into the second mold to coat the fabric preforms and chopped fibers;

curing the resin in the second mold; and removing the structure from the second mold.

\* \* \* \* \*